Patented Feb. 19, 1952

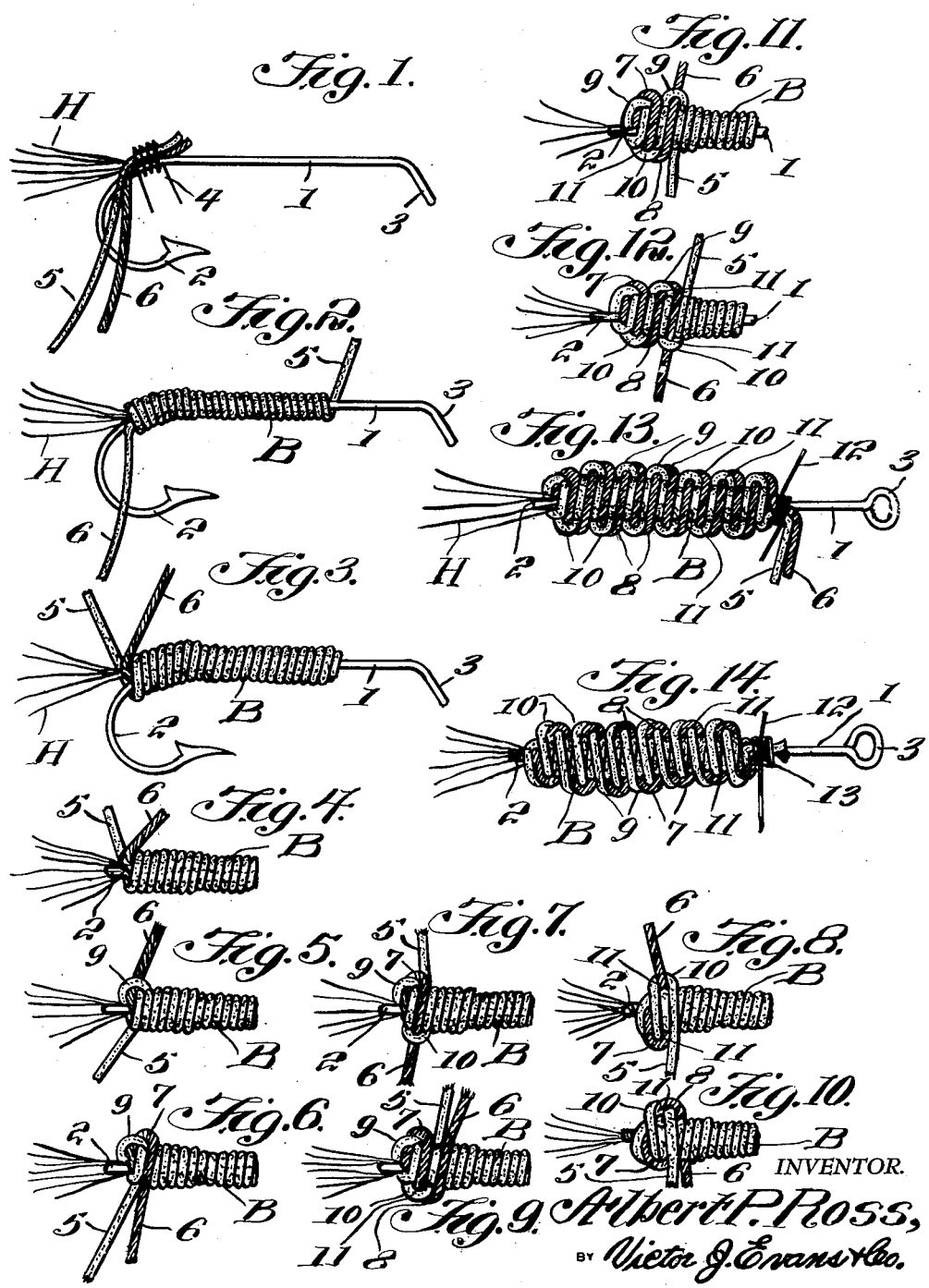

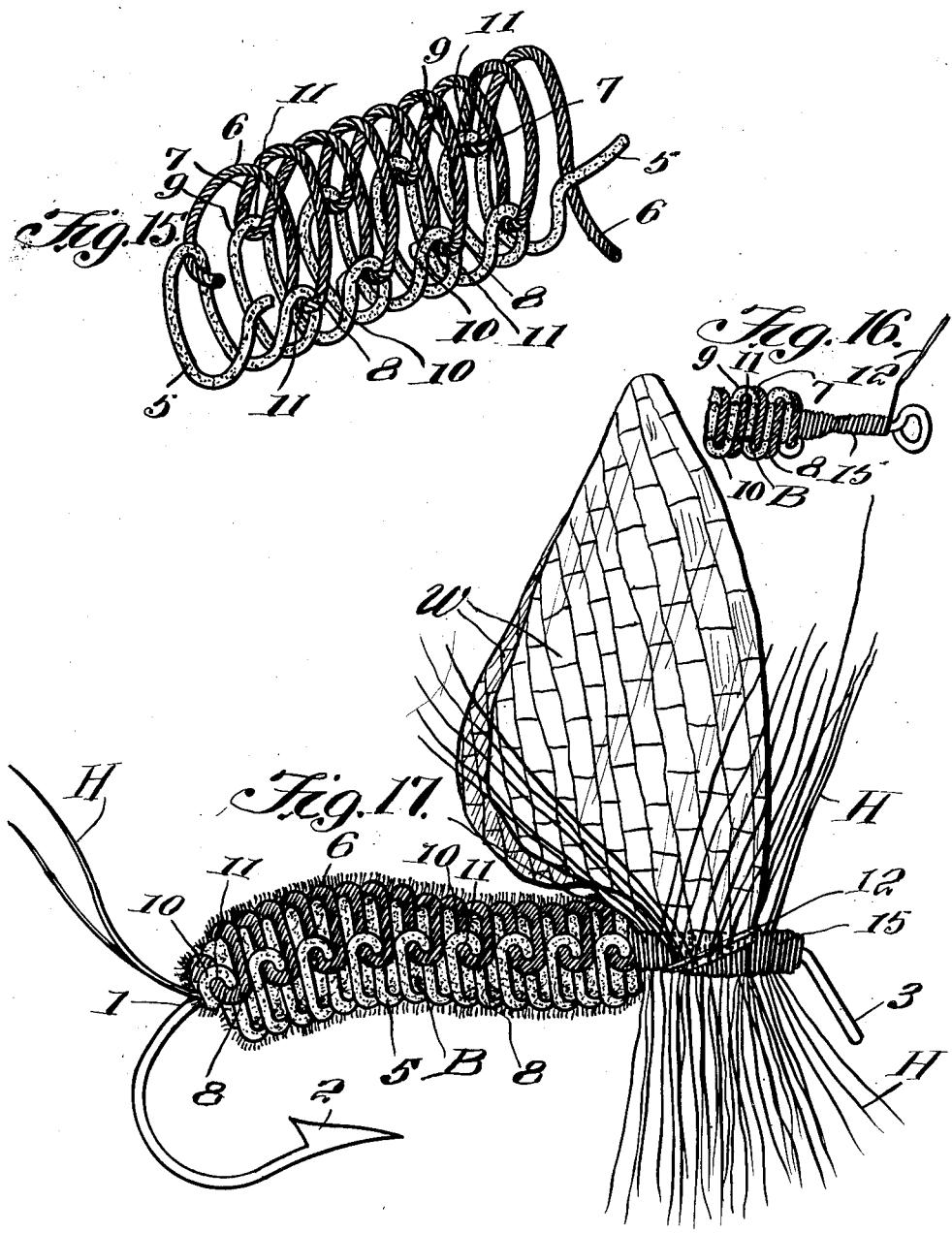

2,586,719

UNITED STATES PATENT OFFICE 2,586,719

INTERLACED SEGMENTED ARTIFICIAL FLY BODY

Albert P. Ross, Springston, Idaho

Application January 11, 1949, Serial No. 70,287

6 Claims. (Cl. 43—42.25)

The present invention relates to fish lures or artificial baits of the insect type in the general class of fishing, and more specifically to interlaced segmented artificial fly bodies and the method of mounting them upon a conventional fishing hook. The fly bodies are manufactured of suitable material such as silk floss, and a base of the body is covered or overlaid and underlaid with two strands of floss, of contrasting colors, that are arranged in transversely extending segments. In the segments are formed a series of U-shape loops which are interlaced to provide a cover or jacket simulating the upper and lower portions of an insect or bait. The invention consists in certain novel features of construction and combinations and arrangements of these parts by which the device may be manufactured with facility and low cost of production, as will hereinafter be described and more particularly set forth in the appended claims.

In the accompanying drawings I have illustrated a complete example of a physical embodiment of the invention and the steps involved in its manufacture, in which the parts are combined and arranged in accord with one mode I have devised for the practical application of the principles of the invention.

It will however be understood that changes and alterations are contemplated and may be made in these exemplifying drawings and structures, within the scope of my claims without departing from the principles of the invention.

Figures 1 through 14, and 16, illustrate the steps, which may be accomplished mechanically, or manually, in the method of forming the lure upon a fishing hook, as will hereinafter be described.

Figure 1 is a detail illustrating the method of starting the winding operation of the red and blue strands on a fish hook showing a red strand and a blue strand with the ends tied to the hook by binding cord or silk thread and with hackles extended from the hook.

Figure 2 is a similar view wherein one of the strands is partially wrapped around the shank of the hook.

Figure 3 is a similar view showing the second strand wrapped over the first strand on the shank of the hook.

Figure 4 is a detail illustrating the foundation winding with the shank of the hook removed.

Figure 5 is a detail similar to that shown in Figure 4 showing the ends of the strands partly tied together.

Figure 6 is a similar view showing a knot formed in the ends of the strands.

Figure 7 is a detail similar to that shown in Figure 6 showing a red strand extended across the winding.

Figure 8 is a view looking upwardly toward the under side of the winding as shown in Figure 7 showing a red strand extended across the winding.

Figure 9 is a view similar to that shown in Figure 7 showing a further step wherein a blue strand is started across the winding.

Figure 10 is a view looking upwardly toward the under side of the winding shown in Figure 9.

Figure 11 is a view similar to that shown in Figure 9 and shows a still further step with an additional wrapping of the blue strand.

Figure 12 is a view similar to that shown in Figure 11 and an additional wrapping of the red strand is shown.

Figure 13 is a plan view looking downwardly upon the upper surface of a complete winding with the blue thread on top.

Figure 14 is a similar view looking upwardly toward the under side of the device as shown in Figure 13 and showing the red strands.

Figure 15 is an enlarged detached and detailed perspective view showing the formation of two strands into the body-cover or ribbed jacket of the lure; and Figure 17 is a view of the completed artificial bait or lure.

The lure is shown mounted upon a conventional fishing hook having a shank 1, the usual barb 2, and the attaching eye 3 for the lead line.

In Fig. 1 a binding cord, string, or silk thread 4 is employed for rigidly affixing or anchoring one end of a suitable length of a strand 5 of red silk floss, and one end of a blue strand 6 of silk floss, together with a number of hackles H. It will be understood that other colors and particularly contrasting colors may be used instead of the colors red and blue, disclosed herein wherein the blue strands are positioned on the upper side or back of the shank of the hook and the red strands are positioned on the underside to represent the breast of an insect.

The complementary ends of the strands are laid longitudinally along the shank of the hook, with their free ends positioned at points intermediate of the barb end of the hook and eye, and the silk attaching thread 4 is wound around the strand ends and the shank of the hook to rigidly bind the strands to the shank, and the binding thread is tied or knotted and cut off.

To form a rounded base B on the shank of the hook, the red strand 5 is now wrapped around the shank, as indicated in Fig. 2, from the barb end toward the eye end of the shank, leaving a bare portion of the shank adjacent the eye 3, and then the strand is re-wound toward the barb end to provide a substantial base, as seen in the following figures of the drawing.

In Fig. 4 the strands are ready for tieing together, and in Fig. 5 and Fig. 6 the two intertwisted strands are started to form the contrasting segments or overlaid and underlaid ribs of the jacket, through the following figures of the drawings to Fig. 10.

Figures 11 through 14 illustrate the method of overlaying and underlaying the strands in contrasting segments of blue and red, and these segments comprise two series with each terminating substantially in a horizontal plane extended through the axis of the shank of the hook and the loops 7 and 8 of the upper or blue series are connected to corresponding loops 9 and 10 of the lower or red series with U-bends, as indicated by the numeral 11. The artificial insect is, thereby, provided with the back of one color and the breast of a different color.

In Fig. 13, after completion of the segmental cover or ribbed jacket, the two strands are rigidly fastened to the shank of the hook by means of a silk thread 12, and in Fig. 14 after the thread 12 has been wrapped around the strands and the shank and tied and knotted, as at 13, to provide a secure fastening for the cover or jacket, the remaining ends of the strands 5 and 6 are cut off.

The combined base B and the exterior segmental cover or ribbed jacket are thus built up to desired shape and size to simulate the artificial fly bait, and to complete the lure hackles H, and a pair of wings which are indicated at W, are mounted on the bare portion of the shank near the eye end. The hackles and the wings may be affixed on the shank by means of the silk thread 12 that is wound or wrapped, as at 15 around the shank to secure the hackles and wing in natural positions; and the entire structure of the lure is thus fashioned into a substantial and durable artificial bait of the insect type.

Having thus fully described my invention, what I claim as new and desire to secure by Letters Patent is:

1. The method of manufacturing fishing fly bodies having dark upper surfaces with light under surfaces which comprises laying on a strand of material of one color back and forth over the upper half of a shank of a fish hook thereby forming said strand into adjacent sections that extend crosswise of the shank and providing U-shape loops at opposite sides of the shank, and laying on a strand of material of a different color back and forth across the under half of the shank thereby forming U-shape loops and passing the loops of the last named strands through the loops of the sections on the upper half of the shank whereby strands of one color are positioned on one side of the shank and strands of another color are positioned on the opposite side of the shank.

2. The method of manufacturing fishing fly bodies having dark upper surfaces with light under surfaces which comprises wrapping the shank of a fish hook with a strand of material and laying on over the said wrapped strand of material a strand of material of one color on the upper semi-circular area of the shank and a strand of material of a different color on the lower semi-circular area of the shank, each of said strands thereby having U-shape bends formed at the sides and with the U-shape bends of the strand covering the lower area of the shank extended through and secured in the U-bends of the strand on the upper area of the shank.

3. The method of manufacturing fishing fly bodies having upper semi-circular surfaces of one color and lower semi-circular surfaces of a different color which comprises laying on a strand of material of one color back and forth over the upper half of a shank of a fish hook thereby forming said strand into adjacent sections that extend crosswise of the shank and providing U-shape loops at opposite sides of the shank, and laying on a strand of material of a different color back and forth across the under half of the shank thereby forming U-shape loops and passing the loops of the last named strands through the loops of the sections of the strand on the upper surface of the wrapped shank whereby the strands of one color are positioned on one side of the shank and strands of a different color are positioned on the other side of the shank.

4. A fish lure comprising a fish hook having a shank, a strand of material formed in semi-circular sections and with the ends of the sections connected on the opposite sides of the shank, and another strand of material of a color different from that of the former strand also formed in semi-circular sections and with the ends of the sections connected on the opposite sides of the shank and wherein the strand of material of the different color is positioned on the lower side of the shank with the former strand on the upper side and wherein the connecting loops of the strands on the sides of the center are interconnected.

5. A fish lure comprising a fish hook having a shank, a strand of material formed in semi-circular sections with the ends of the sections connected on the opposite sides of the shank, said sections being positioned to cover the upper surface of the shank and the said connecting parts of the sections forming loops, and another strand of material of a different color from that of the strand covering the upper surface of the shank positioned to cover the lower surface of the shank and also formed of semi-circular sections with the ends of the sections connected by loops on the opposite sides of the shank, the loops of the sections on the lower side of the shank being extended through the loops of the sections covering the upper surface of the shank.

6. In a fish lure, the combination which comprises a fish hook having a shank, a strand of material wound around the shank and substantially covering the same, a strand of material formed in semi-circular sections with the ends of the sections connected by loops on the opposite sides of the shank, and another strand of material of a color different from that of the former strand also formed in semi-circular sections with the ends of the sections connected by loops extended through the loops of the former sections and wherein the semi-circular sections of the strand of one color are positioned on the opposite side of the center of the hook from the sections of the strand of the other color.

ALBERT P. ROSS.

REFERENCES CITED

The following references are of record in the file of this patent:

UNITED STATES PATENTS

| Number | Name | Date |
| --- | --- | --- |
| 1,640,599 | Conn | Aug. 30, 1927 |
| 1,949,582 | Pott | Mar. 6, 1934 |
| 2,034,832 | Raycroft | Mar. 24, 1936 |
| 2,082,305 | Strong | June 1, 1937 |
| 2,148,799 | Bilinski | Feb. 28, 1939 |